Patented Apr. 17, 1934

1,954,959

UNITED STATES PATENT OFFICE 1,954,959

METHOD OF FREEING OILS FROM SULPHUR DIOXIDE

Reginald K. Stratford and William P. Doohan, Sarnia, Ontario, Canada, assignors to Standard Oil Development Company No Drawing. Application November 29, 1930, Serial No. 499,126

9 Claims. (Cl. 196—24)

The present invention relates to the art of treating hydrocarbon oils and more specifically comprises an improved method for the purification of cracked mineral oils, which have been treated or washed with a reagent containing or yielding sulphur dioxide, (e. g. liquid sulphur dioxide, sulphuric acid or sulphuric anhydride, etc.) to remove the undesirable constituents.

In distilling the acid treated cracked oils, sulphur dioxide passes over with oils in the distillate. The sulphur dioxide causes the bottoms, or oil remaining in the still after distillation, to darken in color. Another disadvantage is that the apparatus used in the distillation is affected by the corrosive action of the sulphur dioxide.

According to the preferred form of this invention, these difficulties are avoided by treating the acid-washed cracked oil with hot caustic, preferably aqueous sodium hydroxide, containing 0.5 to 10% by volume of homologues of phenol or mixture of homologues of phenol. In general, the range is from 3 to 6% by volume. This results in substantially complete elimination of sulphur dioxide forming compounds. Upon redistilling the treated oil, the resulting distillate and the bottoms, or oil retained in the still after the distillation, are found to be substantially free of sulphur dioxide. The temperature of treating may be regulated as desired, but is preferably between 280° to 300° F. The caustic solution is preferably about 30° to 40° Baumé, but other strengths may be used.

As an example of the use of the invention, an acid treated cracked oil was agitated with different solutions listed in the following table, separated, washed with water, and redistilled, giving the following results:

| Treatment | Vapor temperature | Color of distillate | Color of bottoms | $SO_2$ |
|---|---|---|---|---|
| | Degrees F | | | |
| Cold straight lye | 246 | Yellow | Black | 100 |
| 2% cresylic acid in 38° Baumé lye | 344 | Good | Yellow | 0 |
| 1% cresylic acid in 38° Baumé lye | 300 | Good | Yellow | 8 |
| 1% cresol (400–437° F.) in 38° Baumé lye | 338 | Good | Yellow | 8 |
| 1% (10% cresol and 90% xylenol) in 38° Baumé lye | 304 | Good | Brown | 8 |
| 1% xylenol in 38° Baumé lye | 338 | Good | Brown | 8 |

The figures in the column headed "$SO_2$" are percentages of $SO_2$, representing the amount that is given off upon distillation of acid treated cracked oil, using 100 as the figure for $SO_2$ from oil redistilled without treatment according to this invention. It will be observed that 2% cresylic acid (crude cresol) gives complete elimination of sulphur dioxide. The use of 1% of the substances listed gives an elimination which is commercially satisfactory.

Instead of cresols or the like as such, lyes containing them may be used. These lyes (so-called spent lyes) are obtained by washing oils of the type of Colombian crude with caustic. Hot lye, containing spent lye from a previous treatment of petroleum oil, to make it 6 to 8% of spent lye, is active enough to completely remove all the sulphur dioxide forming material from acid treated cracked distillates. Also, naphthenic soaps extracted from petroleum oils, dissolved in proportion of 2% in hot lye solution, are useful in removing sulphur dioxide from acid treated cracked distillates. A naphthenic soap extracted from gasoline cuts is more active than soap from lubricating oil cuts. Colombian oils yield the most effective soaps for this purpose.

Analysis indicated that the organic acidic material obtained from spent lye used in these experiments is in the nature of a cresol. While we believe this to be the case, it will be understood that we intend to claim the material, whatever its chemical nature.

In our U. S. patent application serial No. 279,620, the use of naphthenic acid soaps and spent caustic solutions was disclosed for removing corrosive sulphur from oils.

While the invention has been described particularly with reference to treating mineral oils, it will be understood that the principle disclosed can be applied in analogous situations, for example in the treating of coal tar oils, shale oils, and the like.

We claim:—

1. In a process of treating petroleum hydrocarbon oils that have been treated with a reagent containing sulfur dioxide and that tend to evolve sulphur dioxide, the improvement which comprises contacting the oil with a hot caustic solution containing one or more carbo cyclic oxygenated compounds selected from the group consisting of phenols, homologues of phenol and naphthenic acid compounds, said compounds being present in the treating agent when applied to the oil.

2. In a process of treating hydrocarbon oils that have been treated with a reagent containing sulphur dioxide and that tend to evolve sulphur dioxide, the improvement which comprises contacting the oil with a hot caustic solution containing from 0.5 to 10% of homologues of phenol or mixtures of the homologues of phenol when placed in contact with the oil.

3. Process according to claim 2, in which the homologues of phenol are cresols.

4. Process according to claim 2, in which the homologues of phenol are xylenols.

5. Process according to claim 2, in which a mixture of the homologues of phenol is 10% cresols and 90% xylenols.

6. Process of treating hydrocarbon oils that have been treated with a reagent containing sulphur dioxide and that tend to evolve sulphur dioxide, comprising contacting the oil with a hot mixture of lye and spent lye containing compounds having the sulphur dioxide discharging effect of homologues of phenol, said compounds being present in the treating agent when applied to the oil.

7. Process of treating hydrocarbon oils that tend to evolve sulphur dioxide, comprising contacting the oil with a hot mixture of lye and spent lye containing naphthenic acid compounds, said compounds being present in the treating agent when applied to the oil.

8. Process of treating hydrocarbon oils that have been treated with a reagent containing sulphur dioxide and that tend to evolve sulphur dioxide, comprising contacting the oil with hot caustic containing naphthenic acid compounds, said compounds being present in the treating agent when applied to the oil.

9. Process of treating hydrocarbon oils that have been treated with a reagent containing sulphur dioxide and that tend to evolve sulphur dioxide, comprising contacting the oil with a hot mixture of lye and spent lye containing homologues of phenol, said homologues being present in the treating agent when applied to the oil.

REGINALD K. STRATFORD.
WILLIAM P. DOOHAN.